R. W. RIDER.
LOCK NUT.
APPLICATION FILED MAY 28, 1914.
1,146,101. Patented July 13, 1915.
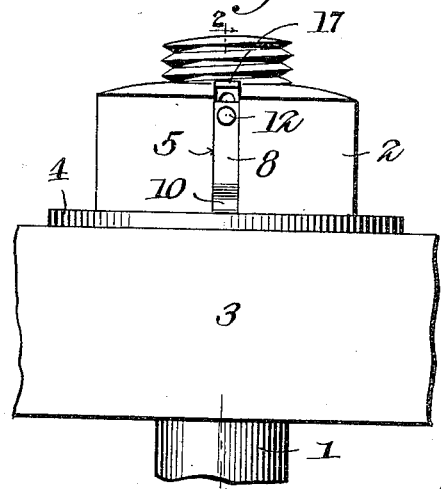
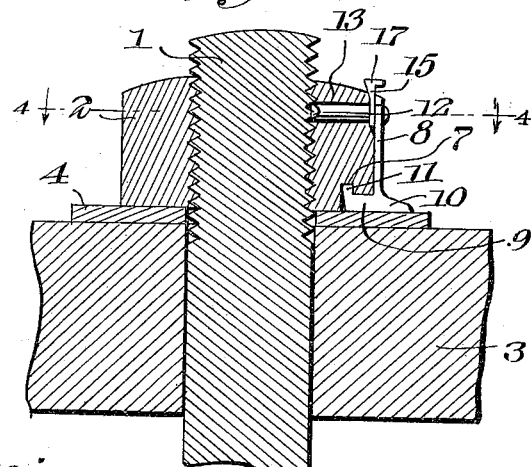
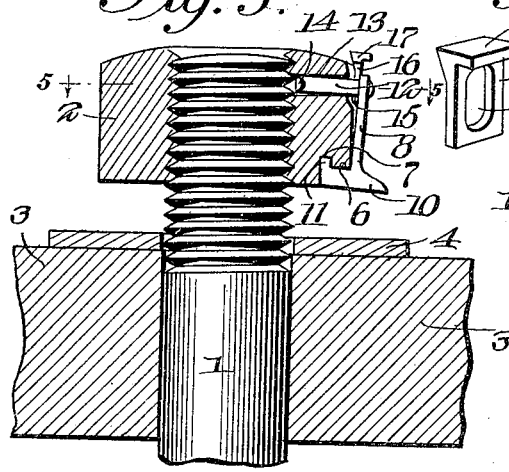
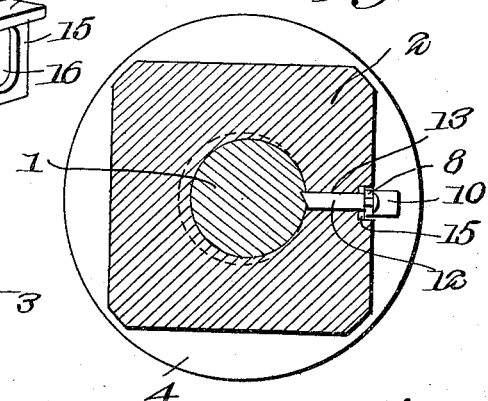
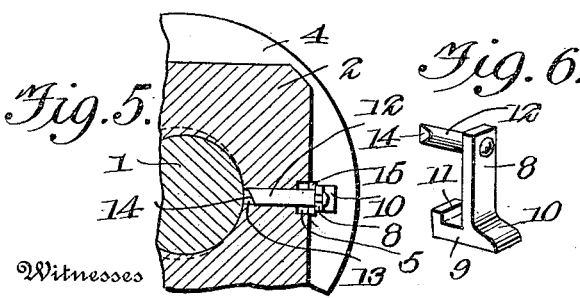
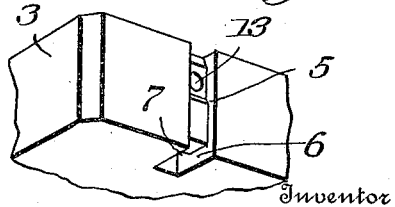
Inventor
R. W. Rider
By Victor J. Evans
Attorney
Witnesses
Hugh H. Ott

UNITED STATES PATENT OFFICE.

ROWLAND W. RIDER, OF LOGAN, UTAH.

LOCK-NUT.

1,146,101.   Specification of Letters Patent.   Patented July 13, 1915.

Application filed May 28, 1914. Serial No. 841,444.

*To all whom it may concern:*

Be it known that I, ROWLAND W. RIDER, a citizen of the United States, residing at Logan, in the county of Cache and State of Utah, have invented new and useful Improvements in Lock-Nuts, of which the following is a specification.

The present invention relates to improvements in means for securely locking a nut upon a bolt.

In carrying out my invention it is my purpose to provide a locking device which may remain a permanent part of a nut and which will automatically engage with the threads of the bolt when the said nut is screwed entirely home upon the bolt and into contact with the plate or surface to be engaged by the nut. I also aim to construct a locking device which is arranged upon a nut in such a manner as to be normally sustained at an angle to the nut, the said device including a pin member which passes through a suitable opening in the nut and is normally arranged adjacent the bore of the nut, and which, when the nut is screwed home, is forced by contact with the surface with which the nut engages to move or swing the locking member to force the pin within the bore of the nut to act upon the threads of the bolt engaged by the nut.

With these and other objects in view, the improvement resides in the construction, combination and arrangement of parts set forth in the following specification and falling within the scope of the appended claims.

In the drawings: Figure 1 is an elevation of a bolt having a nut arranged thereon and provided with a lock constructed in accordance with the present invention, Fig. 2 is a central longitudinal sectional view on the line 2—2 of Fig. 1 showing the nut locked upon the bolt, Fig. 3 is a similar sectional view but illustrating the arrangement of the parts of the lock before the nut is screwed entirely home upon the bolt, or until the said nut is brought into contact with the washer or with the plate with which it is adapted to engage, Fig. 4 is a horizontal sectional view on the line 4—4 of Fig. 2, Fig. 5 is a similar sectional view on the line 5—5 of Fig. 3, Fig. 6 is a detail perspective view of the locking member detached, Fig. 7 is a similar view of the wedge member, and Fig. 8 is a perspective view of the nut with the locking member removed therefrom.

Referring now to the drawings, the numeral 1 designates an ordinary bolt upon which is threaded a nut 2. The bolt passes through a superstructure or plate 3, and preferably arranged upon one of the faces of the plate 3 is a metal washer 4 through which the bolt 1 also passes. The nut 2 has one of its sides or faces provided with a longitudinally disposed slot or depression 5 which intersects a transverse slot 6, and the nut is formed, at the inner wall of the slot 6 with a depression or socket 7. The socket communicates with the rear or inner transverse wall of the slot 6, and the side walls of the said socket are inclined inwardly toward the bore of the nut.

The numeral 8 designates the locking device in its entirety. This locking device is constructed of spring metal and comprises an arm 9 which is adapted to be received within the slot 6, a base 10 being formed upon the arm and extending in opposite directions therefrom. One of the lateral extensions of the base which is adapted to be arranged within the slot 6 has its end provided with an angularly disposed lip 11 which is received within the socket 7, and which sustains the base 10 and the arm 9 at an angle with relation to the face and side of the nut provided with the slots 5 and 7. The arm 8 and the base 10 are constructed of comparatively heavy and strong metal, so that the same will normally swing upon the lip to angular position with relation to the nut and also whereby these members are effectively strengthened. The lip 11 is comparatively thin and more yieldable than the remainder of the lock, and the said lips 11 serve as a hinge or fulcrum from which the lock is suspended. The lip frictionally engages within the depression or socket in the nut so that the lock remains a part of the nut.

The numeral 12 designates a pin that passes through a transverse opening 13 in one side of the nut, the same being arranged centrally of the inner wall of the slot 5. This pin 12 has an inner beveled engaging edge 14, and the width of the said pin at its engaging edge agrees with the width of any of the threads of the nut or the distance between any two threads of the nut. The lip 11 is arranged at only a slight angle with relation to the base, the said angle being sufficient to permit of the base 10 and arm 9 being arranged only a slight distance away from the nut, said distance equaling approximately one-half of the length of the beveled engaging end 14 of the pin 12. It is to be noted that the beveled or engaging edge of the pin 12 is arranged upon the said pin to engage with the threads of the bolt when the bolt or nut are rotated in a retrograde or unscrewing direction, and it is to be further noted that the pin 12 is loosely connected with the arm 9, so that the free longitudinal movement of the same within the opening 13 will not be interfered with.

With an arrangement as described, the nut is screwed upon the bolt and is arranged in close proximity with the washer 4 before the base 10 of the locking member 9 contacts with the washer. A further rotary movement of the nut will cause the lower flat face of the base 10 to be arranged directly upon the outer face of the washer 4 and as a consequence swing the arm 8 so that the same will be fully inclosed within the slot 5 and its pin 12 forced through the opening 13 to bring its biting end 14 into engagement with the threads of the bolt.

In order to permit of the separation of the nut from the bolt I provide a wedge member 15, the same having its body provided with an elongated slot 16 through which the pin 12 passes, and the upper or outer edge of the said wedge is formed with an offset lip or head 17. The member 15 is arranged within the slot 5, and is normally forced outwardly thereof so that the lower transverse wall provided by its opening 16 will contact with one of the faces of the pin 12 so as not to interfere with the operation of the locking device. A blow upon the head 17 will cause the spring arm 9 to move outwardly of the slot 5 carrying with it the pin 12 and bringing its engaging end 14 out of contact with the threads of the bolt, as will readily be understood.

It is, of course, to be understood that if desired the end of the pin 12, which projects a slight distance beyond the outer face of the arm 8 may receive an impact of force such as the blow from a hammer, in which instance, the sharpened end 14 of the pin will mutilate the threads of the bolt, it being understood that the pin 12 is constructed of some strong, tough metal, such as Krupp or Harveyized steel.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. The combination with a bolt and a nut therefor, of a lock having a resilient connection with the nut, said lock including a base and an arm, a pin connected with the arm and passing through an opening in the nut and having its end normally disposed adjacent the bore of the nut, the said lock member adapted to be normally sustained at an angle with relation to the nut and to have its base portion disposed beyond the engaging face of the nut.

2. The combination with a bolt and a nut therefor, of a lock member formed of spring metal including a base and an arm, said base having a flexible connection with the inner face of the nut and normally sustained at an angle to the nut, a pin loosely connected with the arm and arranged within an opening that communicates with the bore of the nut, and the said pin adapted when the angular member is forced into contact with the nut to enter the bore thereof and engage with the threads of the bolt.

3. In a means for locking a nut upon a bolt, a nut, a pin arranged within a transverse opening in the nut, a spring member including an arm and a laterally extending base, a loose connection between the arm and the finger, a spring connection between the base and the nut adapted to normally sustain the base and arm at an angle to the nut, and the end of the pin within the opening and out of the bore of the nut.

4. Means for automatically locking a nut to a bolt, including a nut and a bolt, a member comprising an arm having a base extending from both sides of the arm, the base having one of its ends provided with an angular spring lip which is arranged within an angular socket in the base of the nut, whereby the base and arm is normally sustained at an angle to the base and side of the nut, a pin arranged within the opening in the nut, and adapted, when the base and arm of the member are moved into contact with the face and side of the nut to force one end of the pin through the opening to within the bore of the nut to contact with the threads of the bolt.

5. A nut lock, a bolt including a nut which engages with the bolt, said nut having an opening which enters its bore, a pin having a beveled engaging end within the opening, a right angular member connected with the pin and having a spring connection with the nut whereby said member will be normally sustained at an angle with relation to the nut.

6. Means for locking a nut upon a bolt including a nut having a transverse opening which enters its bore, a pin within the opening having a beveled engaging end, a lock member including an arm which is disposed to one of the sides of the nut and connected with the pin, and a base which extends laterally from the arm, a flexible connection between the base and one of the faces of the nut, whereby the base and arm of the member are retained at an angle to the face and sides of the nut, and a slotted wedge member arranged upon the pin between the arm and the side of the nut.

7. In a lock nut, a bolt and a nut therefor, the nut having a transverse opening which enters its bore, the side of the nut provided with the opening having a longitudinal slot, the base of the nut having a slot arranged at a right angle to and communicating with the first mentioned slot, said base of the nut having an angular socket which communicates with the second mentioned slot, a pin arranged within the opening of the nut having a sharpened end, a lock member comprising an arm of a width equaling the width of the slot at the side of the nut, a base portion extending in opposite directions from the arm and having one of its extensions disposed within the slot in the base of the nut and the said base portion being of a width equaling the depth of the said slot, the base portion having a reduced angular lip which is adapted to be received within the socket and to frictionally engage with the walls thereof, to sustain the said base and arm of the lock member at an angle to the nut and to sustain the sharpened edge normally out of the bore of the nut and away from contact with the threads of the bolt.

8. In a means for locking a nut upon a bolt, a nut having a bolt engaging pin slidably movable in a lateral opening in the nut, a longitudinal member loosely connected with the pin, said member having a laterally extending portion of comparatively heavy material and one end of the said lateral portion having a loose connection with the base of the nut.

In testimony whereof I affix my signature in presence of two witnesses.

ROWLAND W. RIDER.

Witnesses:
R. E. VAN DAM,
THOMAS RIDER.

Copies of this patent may be obtained for five cents each, by addressing the "Commissioner of Patents, Washington, D. C."